United States Patent [19]

Call et al.

[11] Patent Number: 5,258,924
[45] Date of Patent: Nov. 2, 1993

[54] TARGET RECOGNITION USING QUANTIZATION INDEXES

[75] Inventors: Roger W. Call, Salt Lake City; Dennis C. Pulsipher, Farmington; Robert V. Jones, Bountiful, all of Utah

[73] Assignee: Unisys Corporation, Blue Bell, Pa.

[21] Appl. No.: 755,601

[22] Filed: Sep. 5, 1991

Related U.S. Application Data

[63] Continuation of Ser. No. 503,200, Mar. 30, 1990, abandoned.

[51] Int. Cl.$^5$ .............................................. G06F 15/20
[52] U.S. Cl. ....................................... 364/516; 382/16; 382/20; 382/21; 382/22; 382/50; 358/105
[58] Field of Search ................... 364/516, 517; 382/16, 382/20-22, 50, 6, 10, 39, 52; 358/105, 125, 126

[56] References Cited

U.S. PATENT DOCUMENTS

| | | | |
|---|---|---|---|
| H713 | 11/1989 | May et al. ........................... | 364/517 |
| 3,609,687 | 9/1971 | Sublette .............................. | 382/39 |
| 4,707,859 | 11/1987 | Nudd et al. ........................ | 382/50 |
| 4,769,644 | 9/1988 | Frazier .............................. | 382/50 |
| 4,845,610 | 7/1989 | Parvin ............................... | 364/516 |
| 4,972,495 | 11/1990 | Bilke et al. ........................ | 382/22 |
| 5,027,413 | 6/1991 | Barnard et al. ................... | 382/39 |
| 5,134,572 | 7/1992 | Takasaki et al. ................. | 364/514 |

Primary Examiner—Jack B. Harvey
Assistant Examiner—Ellis B. Ramirez
Attorney, Agent, or Firm—Charles J. Fassbender; Mark T. Starr

[57] ABSTRACT

An apparatus for detecting the presence of a target in an n-dimensional array of digital data samples comprises: 1) a reading module, which reads the samples from the data array in overlapping groups; 2) a quantizing module, coupled to the reading module, which quantizes each of the overlapping groups of data samples and which generates an index that identifies the quantized group; and 3) a comparing module, coupled to the quantizing module, which compares indexes from the quantizing module to multiple reference indexes, each of which represents a quantized group of data samples that identify a distinctive feature of the target.

13 Claims, 9 Drawing Sheets

FIG. 10 eq.1 — PLANE #1 = $2X + 5X_R$
eq.2 — PLANE #2 = $1X + 6X_R$
eq.3 — PLANE = ANY 5 CLASS X INDEXES
eq.4 — PLANE #1 = $2Y + 6Y_R$
eq.5 — PLANE #2 = $1Y + 7Y_R$
eq.6 — PLANE = 6 CLASS Y INDEXES
eq.7 — PLANE = ANY 4 CLASS X INDEXES
           <u>AND</u>
           ANY 4 CLASS Y INDEXES

TARGET RECOGNITION USING QUANTIZATION INDEXES

This is a continuation of co-pending application Ser. No. 503,200, filed on Mar. 30, 1990, now abandoned.

BACKGROUND OF THE INVENTION

This invention relates to methods and apparatus for detecting the presence of a target in a scene that is described by an n-dimensional array of digital data samples.

Such an array can have X and Y dimensions which are perpendicular to each other, and the data sample at each X, Y location can give the intensity of light at that location. As another example, the array can have three dimensions X, Y, and Z which are perpendicular to each other; and the data sample at each X, Y, Z location can give the intensity of an x-ray at that location. As still another example, the array can have just a single dimension X; and each data sample along that dimension can give the magnitude of a voltage signal which comes from a microphone and represents speech or other sounds.

In each of the above arrays, a target that is to be recognized can be of any type. For example, in the above two-dimensional case, the target can be an airplane or a car; in the above three-dimensional case, the target can be a fracture in a bone; in the above one-dimensional case, the target can be certain words.

In the prior art, target recognition has been performed by comparing a data sample template of the target to all possible areas in the sampled data scene in which that template could occur. However, a major drawback of such a method is that it requires an extremely large number of comparisons to be performed; and that, in turn, limits the speed at which the targets can be recognized.

For example, consider the case of a two-dimensional scene which is described by a sampled data array that is 512×512 samples in size. Such a data array would make up a single frame of a television picture. Further assume that the target which is to be recognized fits into an area that is 20×20 data samples in size. To compare a 20×20 template of the target with just a single 20×20 portion of the sampled data scene would require a total of 400 comparisons. But in the entire 512×512 sampled data scene, the total number of 20×20 scene portions that exist is [512−20+1][512−20+1]or 243,049; and, each such scene portion needs to be compared on the target template. Thus, the total number of comparisons that need to be performed is (400)(243,049) or 97,219,600.

In addition, even after all of the above comparisons are made, a determination still cannot be made as to whether or not the target occurs in the scene. This is because, in any practical case, each target has a large number of variations. For example, the light intensity on parts of the target relative to the background can be increased or decreased. Also, the angular orientation of the target relative to the background can be rotated anywhere within 360°. To account for all of these variations, many templates would have to be provided for each target; and, the above 97,219,600 comparisons would have to be performed using each template.

Accordingly, a primary object of the invention is to provide an improved method of recognizing targets which can be performed substantially faster than the above-described prior art method.

Another object of the invention is to provide an apparatus for carrying out the steps of the improved target recognition process.

BRIEF SUMMARY OF THE INVENTION

Disclosed is an apparatus for detecting the presence of a target in an n-dimensional array of digital data samples where n is any positive integer. Each data sample contains a certain number of data bits, such as eight bits. Also, in accordance with the invention, the disclosed target recognition apparatus comprises: 1) a reading module, which reads the samples from the data array in overlapping groups; 2) a quantizing module, coupled to the reading module, which quantizes each of the overlapping groups of data samples and which generates an index that identifies the quantized group; and 3) a comparing module, coupled to the quantizing module, which compares indexes from the quantizing module to multiple reference indexes, each of which represents a quantized group of data samples that identify a distinctive feature of the target.

In one embodiment, the comparing module compares indexes of quantized groups of data samples in a predetermined order until a match to one of the reference indexes occurs; and thereafter, the comparing module compares indexes of quantized groups of data samples within a window around the index which caused the match. This embodiment further includes a metric module which evaluates a metric based on any indexes within the window that match the reference indexes. If the evaluated metric meets a threshold criteria, the metric module signals that a target has been detected.

In another embodiment, the comparing module again compares indexes of quantized groups of data samples in a predetermined order until a match to one of the reference indexes occurs. Then, in response to that match, a correlation module aligns a data sample template to the data array based on the target feature which caused the match. Data samples are then read from the data array in the template area and spatially correlated to the template. If the correlation meets a threshold criteria, the correlation module signals that a target has been detected.

With both of the above embodiments, the speed at which targets are recognized, in comparison to the prior art, is substantially increased. One reason for this is that each reference index represents an entire group of data samples which in turn identify a complete distinctive feature of the target. Further, since the data samples from the data array are quantized, and since the reference indexes also represent quantized data samples, variations of intensity in the raw data samples of a scene or target are accounted for. Also, due to the quantizing, angular orientations of a target feature over 360° are covered by rotating that feature in increments of 45° and having just eight reference indexes respectively represent the quantized groups of data samples that occur at each of those angles.

BRIEF DESCRIPTION OF THE DRAWINGS

Various embodiments of the invention, as well as their features and advantages, are described herein in conjunction with the accompanying drawings wherein:

FIG. 3A shows a distinctive feature of a target in the scene of FIG. 1 whereas FIG. 3B shows how the feature of FIG. 3A is represented by a group of digital data samples;

FIG. 6A illustrates the target feature of FIG. 3A in a rotated position, whereas

DETAILED DESCRIPTION OF THE INVENTION

Figure 1:
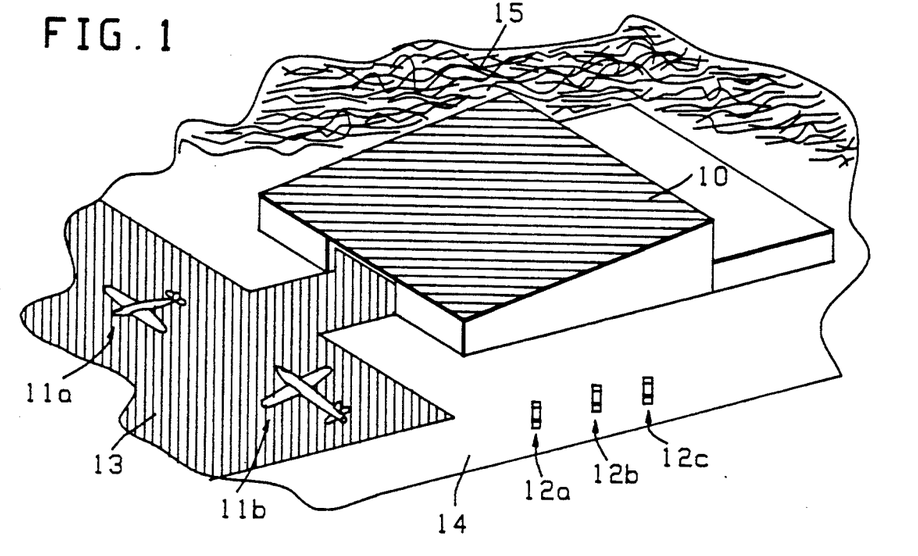
FIG. 1 illustrates a scene which contains several objects, some of which are to be detected as targets.

Referring now to FIG. 1, it shows a picture of an airport that will be used herein to explain the manner in which the present invention operates. In FIG. 1, reference numeral 10 indicates a hangar; reference numerals 11a and 11b indicate respective airplanes; reference numerals 12a, 12b and 12c indicate respective cars; reference numeral 13 indicates a portion of a runway; reference numeral 14 indicates a portion of a driveway; and reference numeral 15 indicates some background. Through the use of a digital optical scanner, all of the objects 10 thru 15 can be represented by a two-dimensional array of sampled data signals. And, by means of the present invention, various targets such as the airplanes 11a and 11b can be detected in the sampled data array.

Figure 2:
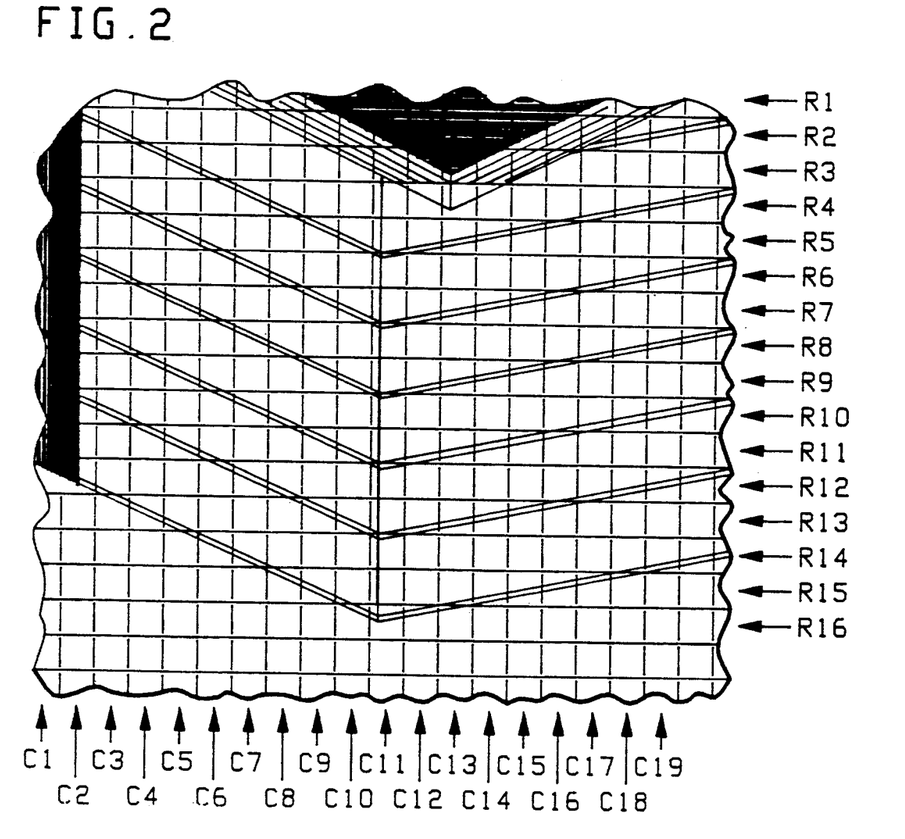
FIG. 2 illustrates how the scene of FIG. 1 is represented by an n-dimensional array of digital data samples.

FIG. 2 shows how a portion of the FIG. 1 scene is represented by the data sample array. In FIG. 2, reference numerals R1, R2, R3, ... indicate respective rows of data samples while reference numerals C1, C2, C3, ... indicate respective columns of data samples. At the intersection of each row-column pair lies a data sample which conventionally is called a pixel. Each data sample has a certain magnitude which is proportional to the light intensity in the scene at the location of the sample. Suitably, each data sample is eight binary data bits; and the light intensity ranges from a value of zero (for the darkest intensity) to a value of two hundred fifty-five (for the brightest intensity). In FIG. 2, the data sample at row R8 column C1 has a value 0; the data sample at row R8 column C3 has a value 255; and the data sample at row R8 column C2 has a value of about 125.

Figures 3A, 3B:
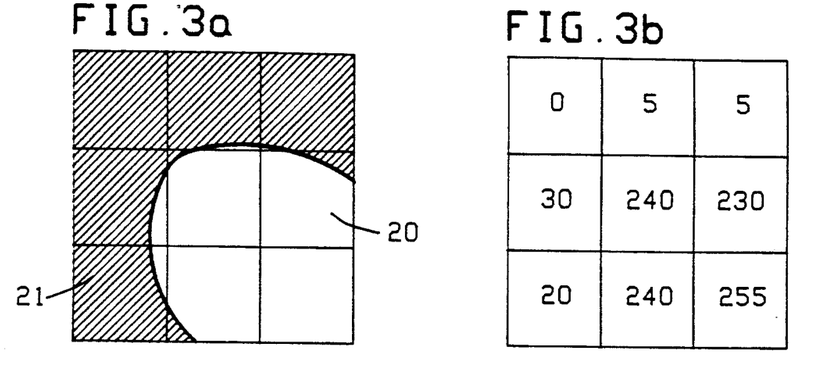

Now in accordance with an initial aspect of the invention, a group of adjacent data samples is selected which identifies a distinctive feature of the target. For example, as FIG. 3a shows, the distinctive feature can be a wing tip 20; and the group of data samples which identify that distinctive feature is three rows high by three columns wide. Inspection of FIG. 3A shows that the light intensity on the wing tip 20 is much brighter than the light intensity of the background around the wing tip. These different light intensities are indicated by the data sample values of FIG. 3B.

Figure 4:
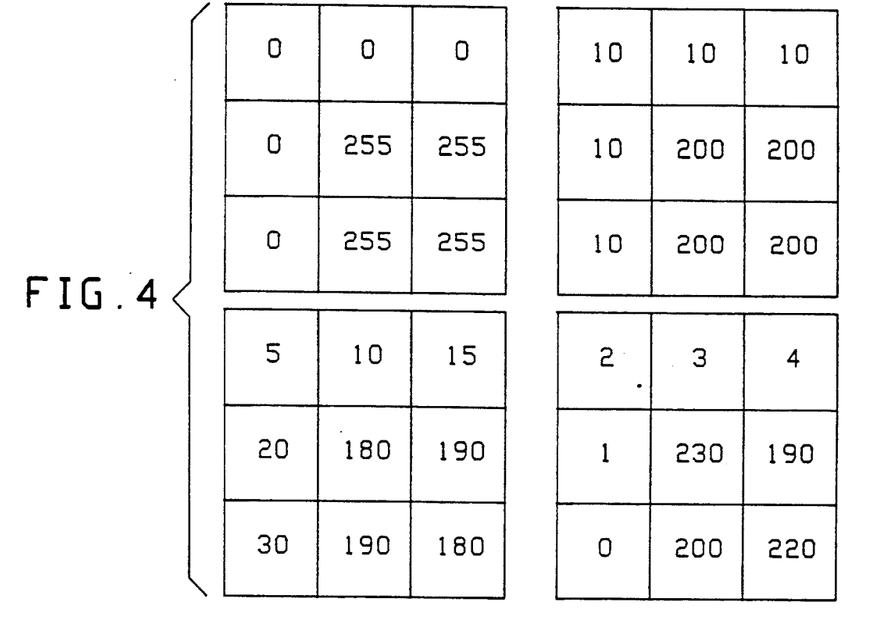
FIG. 4 shows four groups of digital data samples, each of which represents a minor variation of the FIG. 3A target feature.

However, the group of data sample values which are given in FIG. 3B are not the only data sample values that can represent the wing tip 20. Those FIG. 3B data sample values can be decreased by simply adding more shading to the wing tip 20 and/or the background 21; and vice versa. Also, the data sample values of FIG. 3B can be modified by shifting or rotating the position of the wing tip 20 slightly. Four examples of such shading and/or reorienting differences are indicated by the groups of data sample values in FIG. 4.

Figure 5:
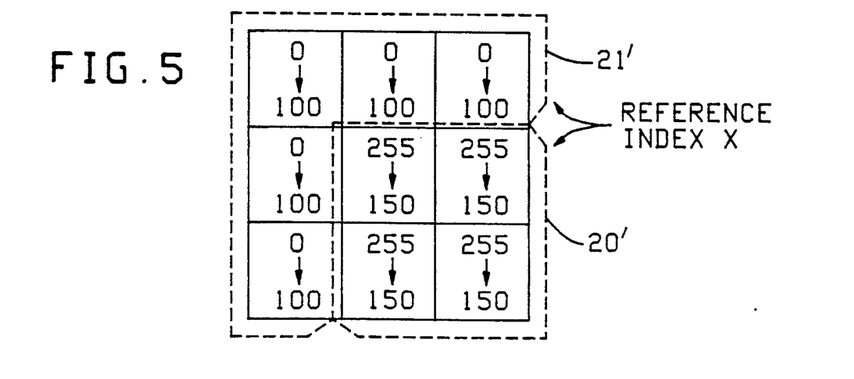
FIG. 5 shows a quantized group of data samples which represent the FIG. 3A target feature and all or substantially all of its variations.

Thus, in order to capture all or a substantial portion of all of the above wing tip variations, an allowable range of values is specified for each data sample in the group. One such range is shown in FIG. 5. There, the wing tip 20 is represented by four data samples 20', each of which has a value that ranges from 255 to 150; and five background data samples 21', each of which have a value that ranges from 0 to 100. This FIG. 5 group of data samples is then identified by a single reference index X, which, for example, is a single 8-bit number.

Figure 6A:
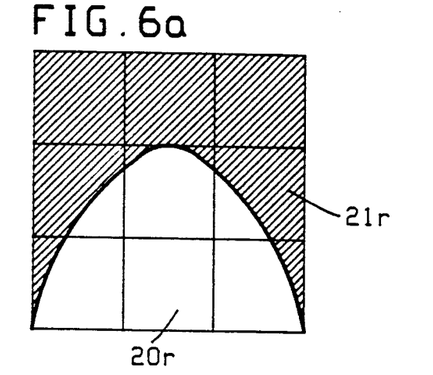
Figure 6B:
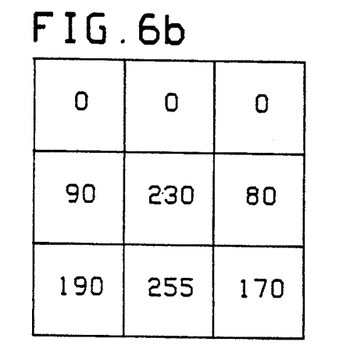
FIG. 6B shows a group of data samples which represent that rotated target feature.
Figure 7:
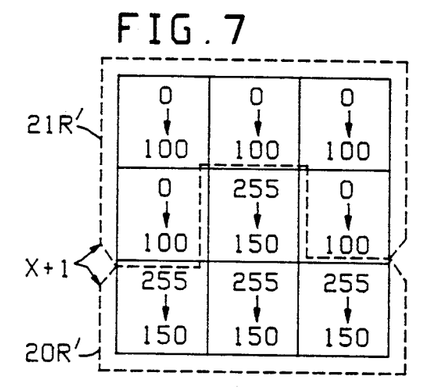
FIG. 7 shows a group of quantized data samples which represent the FIG. 6A target feature and all or substantially all of its variations.

Next in accordance with the invention, the selected target feature of FIG. 3A is rotated in increments through 360°; and, at each incremental position, a group of data sample values and corresponding index is selected to represent the target feature. This is illustrated in FIGS. 6A, 6B, and 7. In FIG. 6A, reference numeral 20r indicates the wing tip 20 after it has been rotated 45° in a clockwise direction, and reference numeral 21r indicates the background around the wing tip after it has been rotated in the same fashion.

Inspection of the relative amount of light in each row-column location in the FIG. 6A array shows that the light intensity at each such location can be represented by the group of data samples that is given in FIG. 6B. Then, to accommodate shading variations and minor position changes of the wing tip 20r and the background 21r, each of the FIG. 6B data samples is assigned a certain range of values. One such range is shown in FIG. 7. There, four of the data samples 20r' which fall primarily on the wing tip 20r range in value from 255 to 150; whereas the remaining data samples which fall primarily on the background range from 0 to 100. This FIG. 7 group of data samples is then identified by another reference index X+1.

In like fashion, reference indexes are obtained for other angular orientations of the FIG. 3A wing tip in increments of 45°. Indexes for each such orientation are obtained by repeating the process of FIGS. 6A, 6B, and 7. Alternatively the range of values for the group of data samples that represent the rotated wing tip feature can be obtained by simply shifting all of the data sample values of FIG. 5, except the center sample, in a clockwise direction. For example, the FIG. 7 data sample values around the perimeter of that group are the same as the FIG. 5 data sample values shifted clockwise by one position. A total of seven such clockwise shifts can be made, and the groups of data samples that result from such shifts are identified by respective indexes $X+1$, $X+2, \ldots X+7$.

Figure 8:
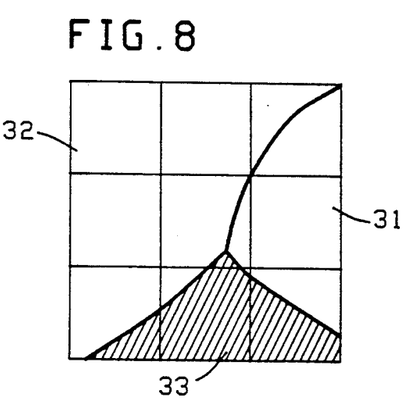
FIG. 8 shows another distinctive feature of the target in FIG. 1.

If the target that is to be recognized has multiple distinctive features, then all of the steps that have been explained above in conjunction with FIGS. 3A thru 7 are repeated for each of those features. For example, another distinctive feature of the airplanes 11a and 11b occurs where a portion of the plane's wing joins a portion of the plane's body. This is illustrated in FIG. 8 wherein reference numeral 31 indicates the wing portion of the plane; reference numeral 32 indicates the body portion of the plane; and reference numeral 33 indicates background. All of the items 31, 32, and 33 can be represented by a group of data samples, each of which has a certain range of values; and that group of data samples can in turn be identified by a single reference index Y. Likewise, rotations of the FIG. 8 feature in increments of 45° can be represented by respective reference indexes $Y+1, Y+2, \ldots Y+7$.

Figure 9:
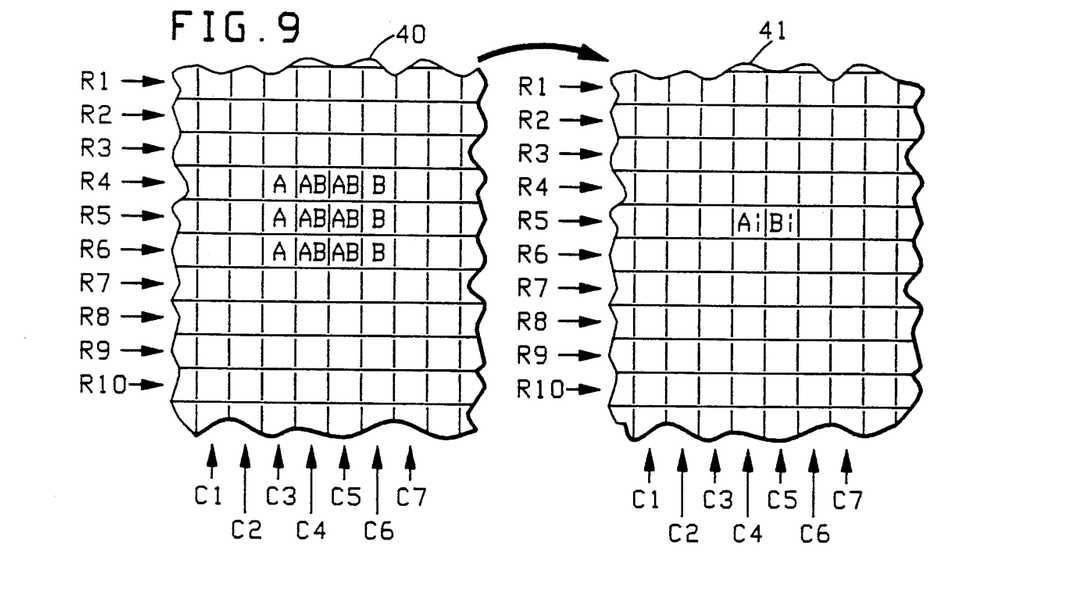
FIG. 9 illustrates some initial steps of the target recognition process during which overlapping groups of data samples in the n-dimensional data array are quantized and stored in an index array.

After the above steps are carried out, the data samples which make up the entire scene that is to be searched for targets is processed as illustrated in FIG. 9. In that figure, reference numeral 40 indicates a portion of the data samples in the scene that is to be searched; and reference numeral 41 indicates an index array which is formed by processing the samples in array 40. Rows in both of the arrays 40 and 41 are indicated by reference numerals R1, R2, . . .; and columns are indicated by reference numerals C1, C2, . . .

To generate an entry in the index array 41, a group of data samples in the data array 40 are quantized; and an index which represents that quantized group of data samples is placed in the index array. For example, the group of data samples "A" in the data array 40 are quantized and represented by the index $A_i$ in the index array 41. This quantizing step is performed on all overlapping groups of data samples in the array 40 which differ from one another by one row or one column. For example, the group of data samples "B" in array 40 is quantized, and those quantized samples are represented by an index $B_i$ in the array 41.

Next in accordance with the invention, the indexes in the array 41 are read in a predetermined order and compared to all of the reference indexes. For example, the indexes in row R1 of the array 41 can be read and compared one at a time from left to right; then the indexes in row 2 can be read and compared one at a time from left to right; etc. This reading and comparing continues until a match to one of the reference indexes occurs.

Figure 10:
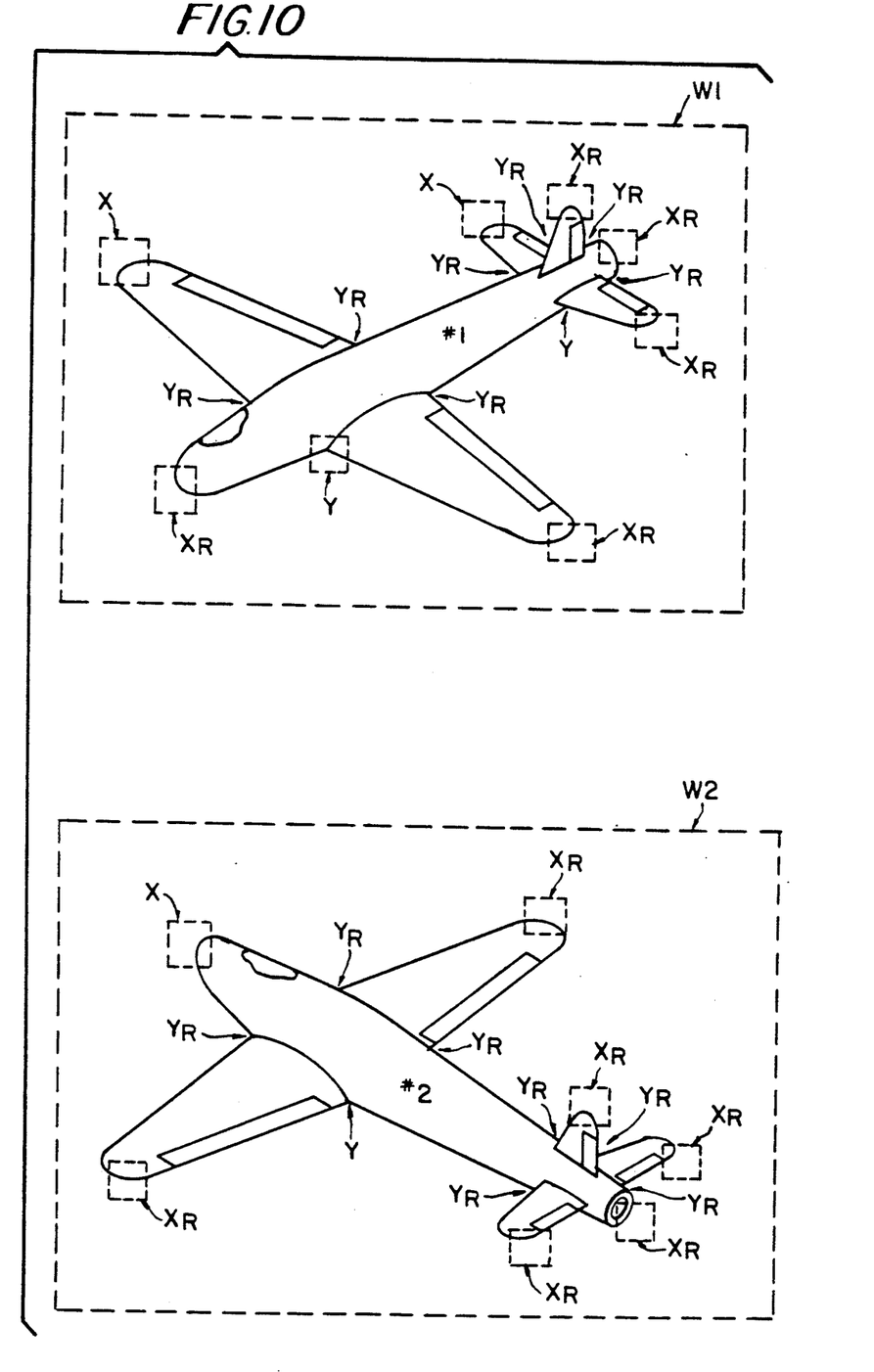
FIG. 10 illustrates further steps of the target recognition process during which windows within the index array are opened and searched for reference indexes.

Such a match indicates the possible detection of a target. However, a single match does not guarantee that a target is present since the scene that is being scanned contains many other objects—some of which may also cause the match. To avoid this problem in accordance with the invention, a window W1 is opened in the index array 41 when a match occurs as is shown in FIG. 10. This window is made large enough to encompass the index which caused the match plus all of the indexes from a complete target. Indexes within the window are compared to the reference indexes; and those indexes which match the reference indexes are applied to a metric. If the evaluated metric meets a certain threshold criteria, a signal is generated which indicates that a target has been found.

For example, within the window W1 of FIG. 10, the quantized group of data samples that are identified by reference index X occurs two times, and five rotations of those data samples as identified by indexes $X_R$ also occur. This is stated by equation 1 in FIG. 11. However, a metric which requires two occurrences of the reference index X and five occurrences of the indexes $X_R$ would be too restrictive since it would not detect a target in all of its various possible orientations. This is evident from inspection of plane #2 in window W2 of FIG. 10.

In window W2, the quantized data samples that are identified by reference index X occur just one time, and the rotated data samples as identified by indexes $X_R$ occur six times. This is stated in FIG. 11 by equation 2. Thus, by deduction, one suitable metric for the detection of a plane having any orientation is the occurrence of any five class X indexes within a window of the index array 41, where a class X index is defined to be the indexes X and $X_R$.

Equation 3 could also be modified to require fewer or more occurrences of the class X indexes. Requiring fewer indexes lowers the threshold criteria of the metric, where requiring more indexes raises the threshold criteria. Having a low threshold allows for potential mismatches with the reference indexes; however, a threshold which is too low will allow a non-target object to be falsely identified as a target.

Figure 11:
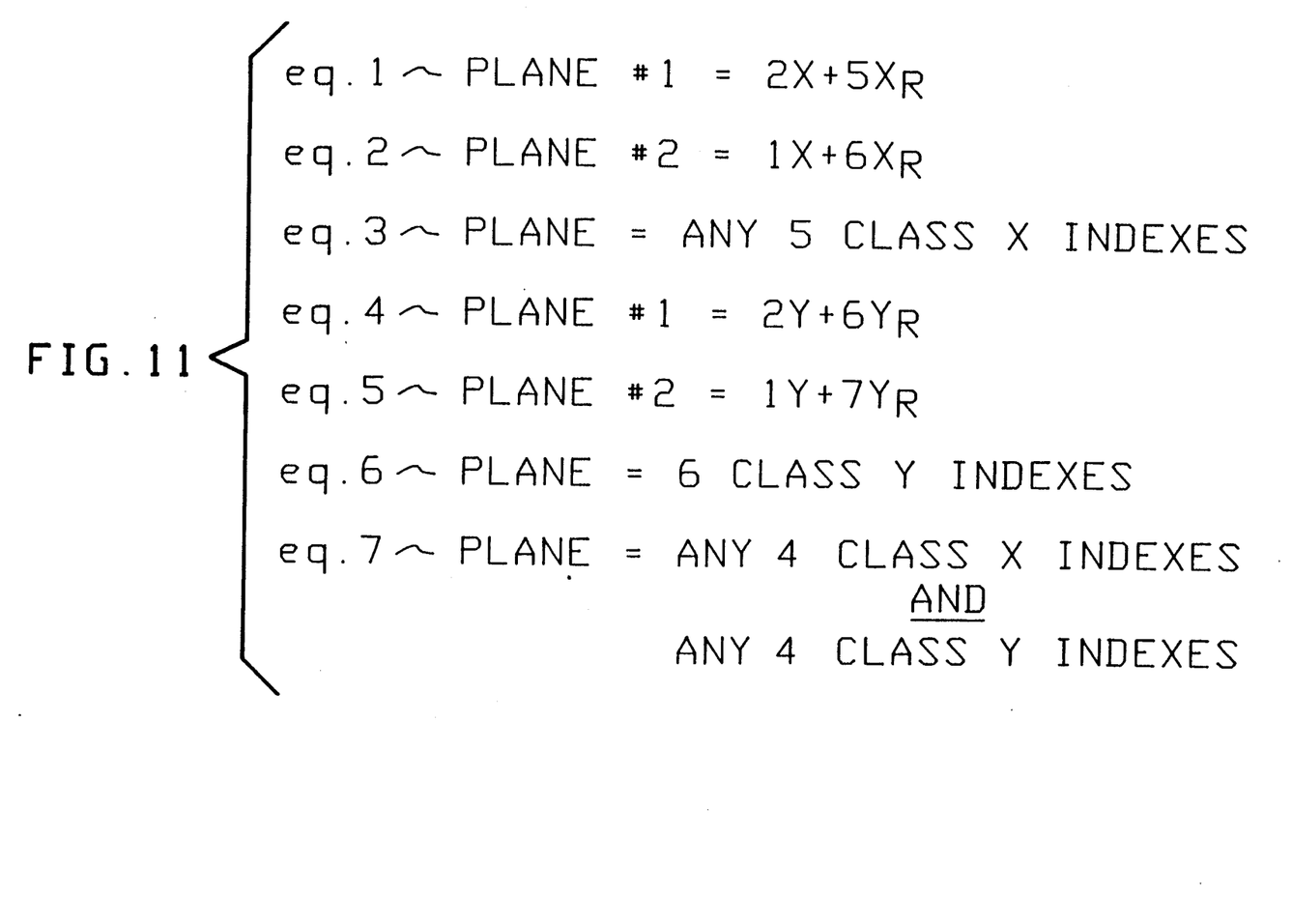
FIG. 11 illustrates final steps of the target recognition process during which a metric is evaluated to determine if a target occurs within the window.

In like fashion, the reference index Y and its rotations can be used with a metric to detect the presence of a target within a window. For example, in window W1, reference index Y occurs two times and its rotations occur six times. This is stated by equation 4. In window W2, reference index Y occurs one time and its rotations occur seven times. This is stated by equation 5. Thus, another suitable metric for the detection of a target is the occurrence of any six class Y indexes within a window. This is stated by equation 6.

Various combinations of the reference indexes X and Y and their rotations can also be used as a metric. For example, as equation 7 states, the detection of a plane can be signaled by the occurrence within a window of any four class X indexes plus the occurrence of any four class Y indexes.

Figure 12:
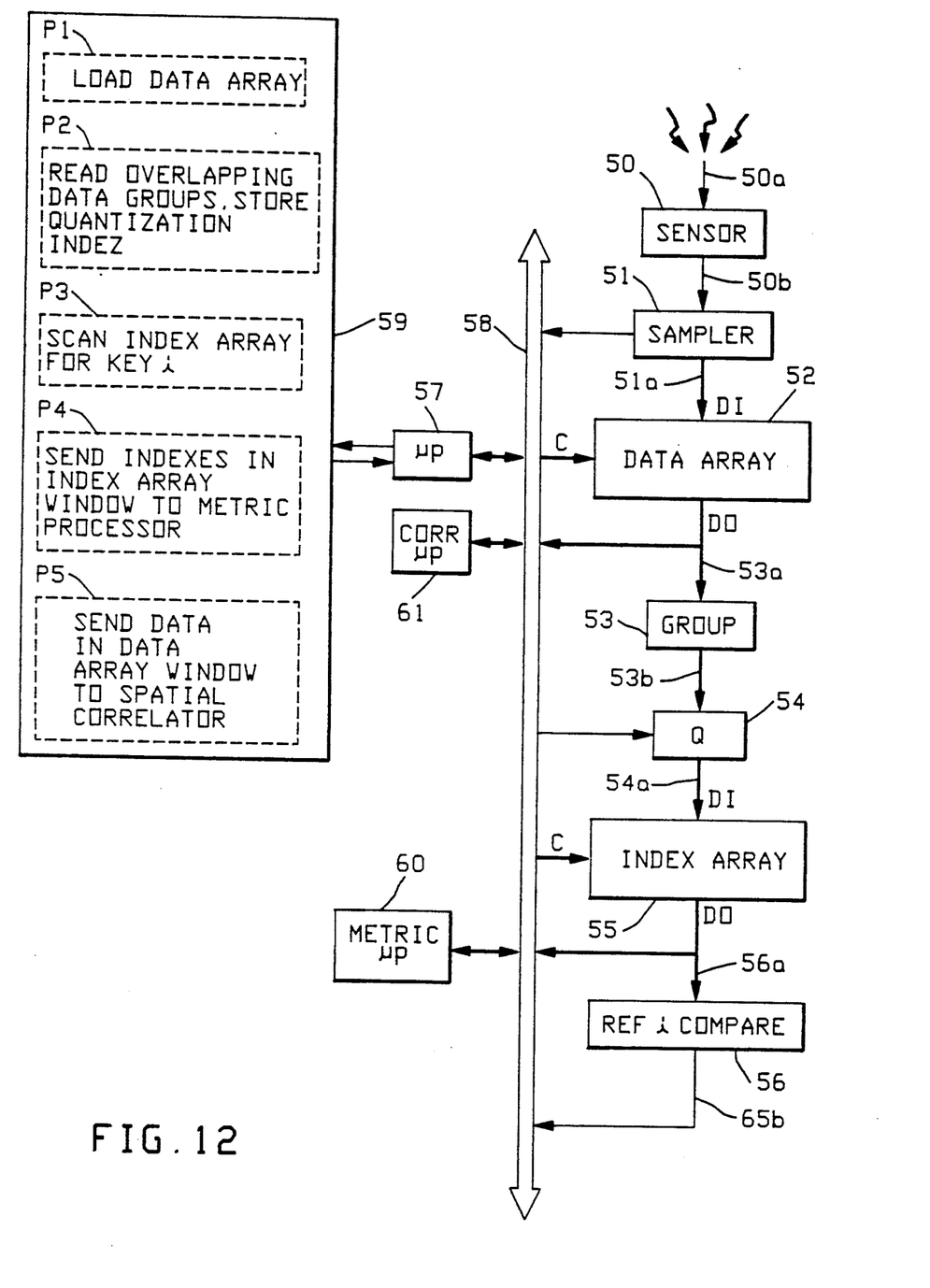
FIG. 12 illustrates an apparatus which performs all of the target recognition steps of FIGS. 9, 10, and 11.

Turning now to FIG. 12, it shows an apparatus which carries out all of the above-described target detection steps. This apparatus includes several modules that are identified by reference numerals 50 thru 61. Each of these modules and their interconnections are as follows.

Module 50 is a sensor or transducer. It senses signals of any desired type from a scene that is to be searched on an input 50a, and it converts those signals to output voltages on a lead 50b. For example, sensor 50 can be of a type which senses optical signals, infrared signals, radar signals, x-ray signals, or sound signals on its input 50a and which converts them to the voltages on lead 50b.

Module 51 samples and digitizes the voltages on the leads 50b. Each such digital sample is in the form of a binary number that is generated on output leads 51a. Also, to indicate when a digital sample is present, module 51 generates a control signal on an output lead 51b.

Module 52 is a digital memory. It has data inputs DI which receive the digital data samples on the leads 51a, and it stores these samples in response to address signals and write control signals on its control terminals C. Those stored data samples are subsequently read from the memory's data output terminals DO in response to other address signals and read control signals on the control terminals C.

Module 53 is a register. It receives and accumulates respective groups of data samples from the data array 52 via input terminals 53a. Each group of data samples is then sent from the register's output terminals 53b to module 54 which is a quantizer. Output signals from the quantizer 54 occur on output lines 54a, and they are in the form of an index which identifies a quantized group of data samples to which the sample group in register 53 belongs.

Module 55 is a digital memory. It has data inputs DI which receive the quantization indexes on the leads 54a, and it stores the indexes in response to address signals and control signals on control terminals C. Stored indexes are subsequently read from the memory's data output terminals DO in response to other address signals and control signals on the control terminals C.

Module 56 is a comparator. It has input terminals 56a which receive indexes from the index array 55; and, it compares the received index to all of the reference indexes. When a match occurs, module 56 generates a signal on an output lead 56b which indicates that occurrence.

Module 57 is a microprocessor. It is coupled via an input/output bus 58 to several of the other modules, and thus the microprocessor is able to transmit and/or receive data and control signals to/from those modules. For example, microprocessor 57 is coupled to module 51 which enables the microprocessor to test for the presence of a sample. Also, microprocessor 57 is coupled to the control terminals C of memory 52 which enables the microprocessor to direct that memory to write and read the data samples.

Module 59 is a memory which holds several programs that the microprocessor 57 executes. These programs are indicated in FIG. 12 by reference numerals P1, P2, P3, P4, and P5. Flow charts of those programs are shown in FIGS. 13A thru 13F.

Module 60 is a second microprocessor which is coupled to the bus 58. In operation, microprocessor 60 receives selected indexes from the index array 55 under the direction of commands from the microprocessor 57; and, microprocessor 60 uses the indexes which it receives to evaluate a metric. If that metric meets a certain threshold criteria, then microprocessor 60 signals microprocessor 57 via the bus 58.

Module 61 is a third microprocessor which is coupled to the bus 58. In operation, microprocessor 61 receives selected data samples from the array 52 under the direction of commands from the microprocessor 57; and, microprocessor 61 performs spatial correlations on those data samples. If the correlations meet a certain threshold criteria, microprocessor 61 signals microprocessor 57 via the bus 58.

Turning now to FIGS. 13A thru 13E, each of the programs P1-P5 which microprocessor 57 executes will be described. Beginning first with FIG. 13A, it shows a flow chart for program P1 which loads data array 52 with data samples from the sensor 50. This task is performed by steps 70a-70e. Initially, microprocessor 57 forms an address at which the first data sample is to be stored. Thereafter, the microprocessor stores each sample as they are generated at respective locations in the data array until a complete scene of samples is stored. By a scene is herein meant all of the data samples that are to be searched for a target. For example, in the case of a two-dimensional array in which data samples form a visual image, a scene may be 512×512 samples.

Figure 13A:
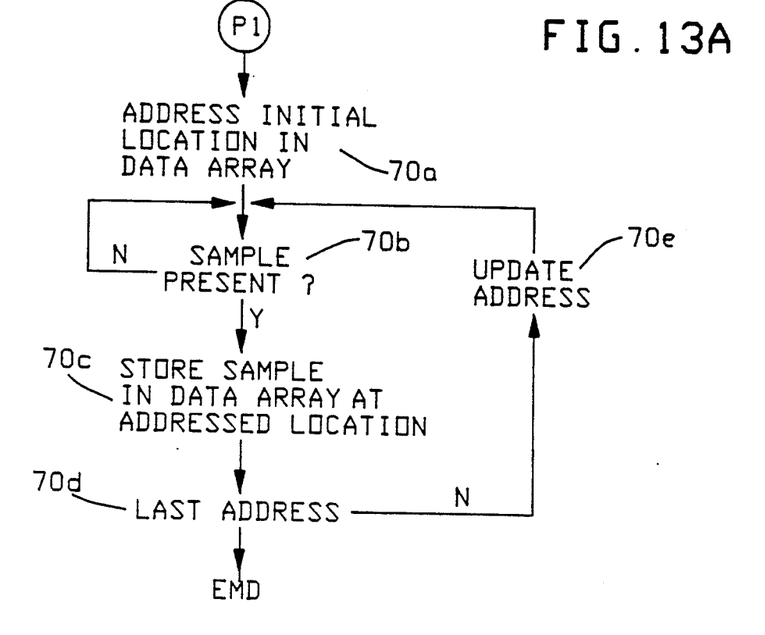
FIGS. 13A-13E are flow charts of respective programs which are stored in and direct the operation of the FIG. 12 apparatus.
Figure 13B:
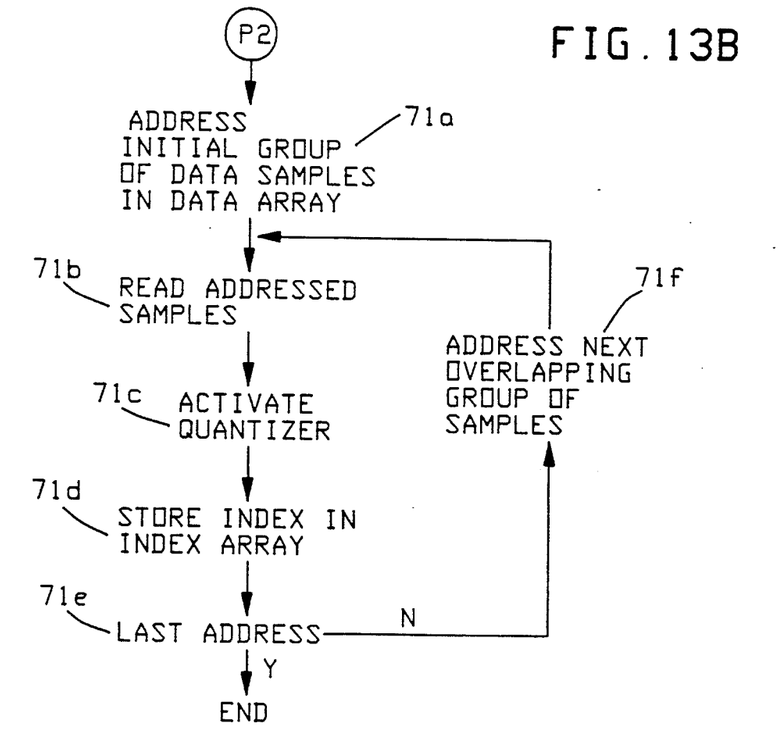

Subsequently, program P2 is performed. This program reads data samples from array 52 in overlapping groups; those groups are quantized; and indexes which identify each group are stored in the index array 55. This is performed by steps 71a-71e. Step 71a addresses the initial group of data samples in array 52. Addressed data sample groups are read and quantized by steps 71b and 71c. Step 71d stores an index which represents a quantized group of samples in the index array 55. Step 71e determines if all of the data sample groups have been quantized, and step 71f addresses the next overlapping group of data samples.

Figure 13C:
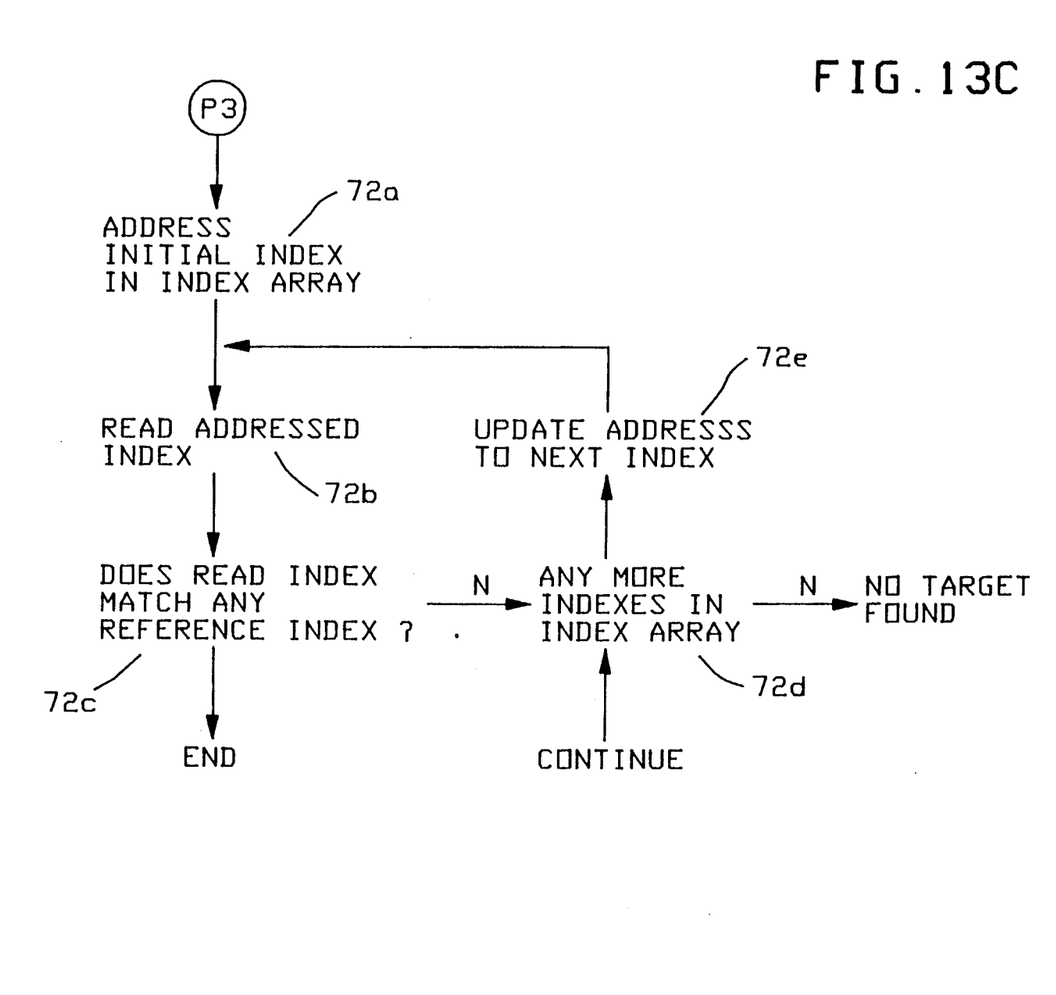

Thereafter, program P3 of FIG. 13C is executed. It performs steps 72a-72e by which indexes are read in a predetermined order from the index array 55 and compared to the reference indexes. If a match occurs, then a branch is taken to either a metric evaluation program P4 or a spatial correlation program P5. If the index that is being compared is the last index in array 55 and it does not match any reference index, then a determination is made that no targets are present in the scene.

Figure 13D:
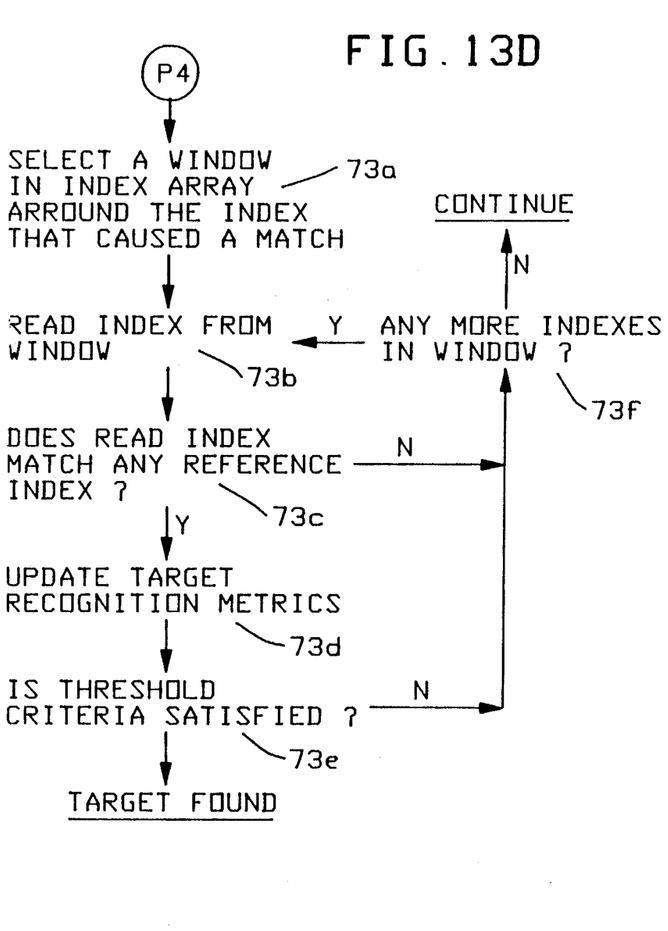

In program P4 of FIG. 13D, a window is opened in index array 55 around the index of step 72c which caused the match. This window is made large enough to include all of the indexes from a complete target. Indexes are read from that window and compared to the reference indexes. If a match occurs, then the index which caused the match is sent to the metric microprocessor 62 which updates a target recognition metric. If the updated metric meets a certain threshold criteria, the metric microprocessor generates a signal on the bus 58 indicating that a target is present within the window. If, however, the threshold criteria is not satisfied after all of the indexes within the window have been examined, then program P3 is reentered and continued, beginning at step 72d. All of this is indicated by reference numerals 73a-73f.

Figure 13E:
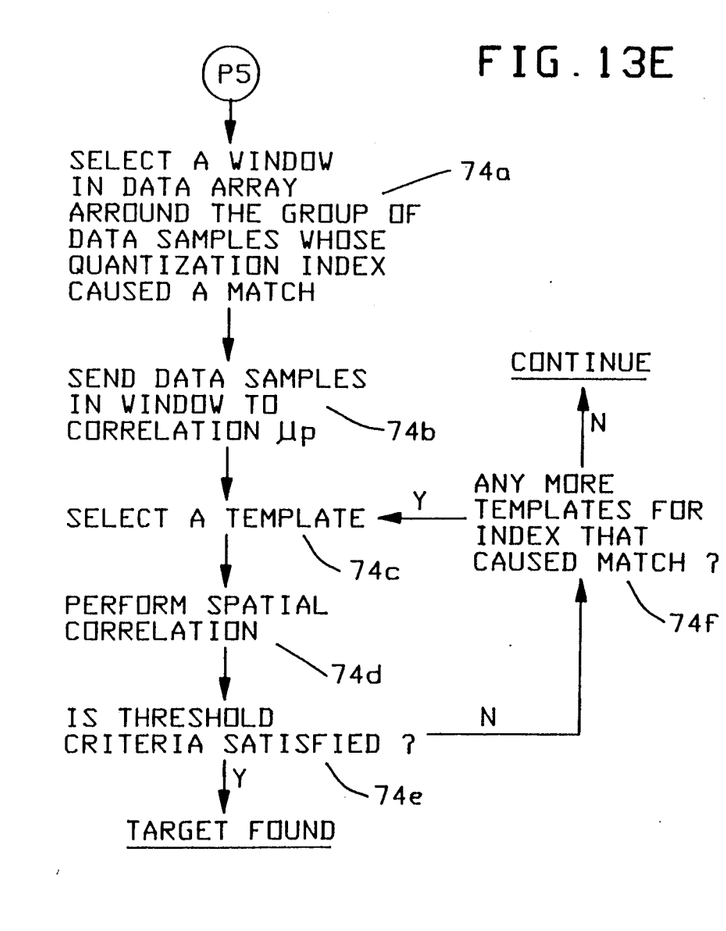

In program P5, a window is opened in the data array 52 around the group of data samples whose quantization index caused a match in step 72c. This window is made large enough to include all of the data samples from a complete target. Data samples within that window are read by the correlation microprocessor 61 and spatially correlated to a template of the target. In performing this correlation, the template is first aligned to the window based on the quantization index which caused the match. For example, if index X of FIG. 10 caused the match, then three alignments are made. If any such spatial correlation meets a certain threshold criteria, then the correlation microprocessor generates a signal on the bus 58 indicating that the target is found. If the threshold criteria is not met, then program P3 is reentered and continued at step 72d.

A preferred process and apparatus for detecting targets in accordance with the invention have now been described in detail. In addition, however, many changes and modifications can be made to those details without departing from the nature and spirit of the invention.

For example, the components which are used to implement the various modules 50-61 of FIG. 12 are not limited to any particular type. Microprocessors 57, 60 and 61 suitably are a Motorola 68020 or an Intel 80386. Data array 52 and index array 55 can be constructed from any static RAM chips or dynamic RAM chips. Comparator 56 can be a ROM chip which is addressed by the indexes from the array 55 and which at each addressed location stores either a one or a zero to respectively indicate whether the addressed index matches or does not match any reference index. Quantizer 54 can be any logic circuit which performs the function of generating an index on its output terminals 54a that identifies a quantized group of data samples which encompass the particular group of data samples that are in register 53. Additional background on various quantizers is given in a paper by Robert M. Gray entitled "Vector Quantization", published in IEEE ASSP Magazine, April, 1984.

Further, the quantizer 54 need not generate all of the indexes that are needed to reconstruct the scene that is in the data array 52. All that is necessary is for the quantizer to generate the reference indexes and one other index which indicates that the corresponding group of data samples is not a distinctive feature of the target. This can significantly reduce the total number of indexes which the quantizer generates and thus reduce the number of bits per index in the index array. For example, suppose that a two-dimensional visual scene is stored in the data array 52. To quantize groups of data samples from that scene such that the scene can be reproduced from the quantization indexes typically requires a total of about 256 different indexes, or eight bits per index. By comparison, to simply identify distinctive target features typically requires a total of less than 32 different indexes, or five bits per index.

Also, the sampled data scene which the present invention examines for targets is not limited to a two-dimensional visual scene. For example, the scene that is examined can have three dimensions X, Y, and Z which are perpendicular to each other with the data sample at each X, Y, Z location giving the intensity of an x-ray at that location. As another example, the scene that is examined can have five dimensions—two of which are X and Y locations, and the remaining three of which give respective intensities of the colors red, blue, and green at the X, Y location. As another example, the scene that is examined can have just one dimension wherein data samples are stored consecutively as they occur in time. Such data samples can, for example, be samples of a voltage waveform that represents speech from an ordinary microphone.

Further, the targets which the present invention detects are not limited to airplanes. These targets can be anything which has a distinctive feature with respect to the scene in which it lies. For example, in the case of a one-dimensional array of speech samples, the target can be a set of spoken words and the reference indexes can identify quantized groups of data samples from distinctive sounds in the words. In the case of a two-dimensional array of data samples of a page of text, the target can be a set of written words, and the reference indexes can identify quantized groups of data samples from the letters in the words.

Also, the groups of samples that are read from the data array and quantized are not limited to being 3×3 in size. Those data sample groups can be any size which is large enough to just barely include a distinctive feature of the target. This constraint reduces the amount of circuitry that is required to implement the quantizer 54. For most optical targets, a practical range for the size of each data sample group is from two to twenty samples in each direction of the n-dimensional array 52; whereas for audio targets, a practical range for each data sample group is from fifty to five thousand samples in the one-dimensional array.

Further, the quantized groups of data samples, and their corresponding indexes, which identify distinctive features of the target, can vary with time. For example, a target which is to be detected can have one set of reference indexes when a daytime scene is being searched and a different set of reference indexes when a nighttime scene is being searched.

In addition, the FIG. 12 embodiment can be modified by deleting the index array 55, and coupling the index output terminals of the quantizer 54 directly to comparator 56 and the I/O bus 58. With this modification, the index of a quantized data sample group is generated each time it is needed. Thus, whenever microprocessor 57 or 60 needs to operate on a particular index, the microprocessor must first address the data array 52 and read from it the group of data samples whose quantization index is sought. After reading that group of data samples, the quantization index, and the result of its comparison to the reference indexes, are obtained via the bus 58 from the quantizer 54 and comparator 56.

Also, a wide variety of metrics can be used to determine whether the indexes that are found within an index array window constitute a target. For example, an Euclidean metric, as given below, can be used.

$$(x_i-x_a)^2+(y_i-y_a)^2+\ldots > \text{threshold}$$

In this metric, $x_i$ is the number of times index x should ideally occur in a window if a target is present; $x_a$ is the number of times index x actually occurs in the window; $y_i$ and $y_a$ are similarly defined for the y indexes; etc.

Likewise, various spatial correlations can be used, after an index match occurs, to determine whether the data samples that lie within a data array window constitute a target. One suitable spatial correlation is given below.

$$\Sigma(d_{xy})(t_{xy}) \div (t_{xy})^2 > \text{threshold}$$

In this correlation, $d_{xy}$ is the data sample at location xy in the data array, and $t_{xy}$ is the data sample in the target template at location xy.

As another variation, the data samples in the data array window can be Sobel filtered prior to the correlation step to enhance any edges within the window. In that case, the target template would be a Sobel filtered image of the target.

Accordingly, it is to be understood that the invention is not limited to the above-described details but is defined by the appended claims.

What is claimed is:

1. Apparatus for detecting the presence of a target in an n-dimensional array of data samples, where each data sample has a first set of values and n is a positive integer; said apparatus comprising:
   a memory means, for receiving and storing said array of data samples from a signal sensor;
   a reading means, for reading said data samples from said memory means in overlapping groups;
   a quantizing means, coupled to said reading means, for quantizing each of said overlapping groups of data samples such that all of the data samples in any one particular group are restricted to a second set of values which is smaller than said first set and which are represented by an index; and,
   a comparing means, coupled to said quantizing means, for identifying which of said indexes from said quantizing means match predetermined reference indexes, each of which represents a quantized group of data samples that occurs in said target and is perceived as being separate or different with respect to the remainder of said array; and, a metric means coupled to said comparing means, which generate a target detect signal only if said identified indexes from said comparing means occur in certain predetermined combinations.

2. Apparatus according to claim 1 wherein a first one of said reference indexes represents a quantized group of data samples from a particular region of said target, and a second one of said reference indexes represents a quantized group of data samples from a different region of said target.

3. Apparatus according to claim 1 wherein a first one of said reference indexes represents a quantized group of data samples from a particular region of said target, and a second one of said reference indexes represents a quantized group of data samples from the same region but with a different orientation.

4. Apparatus according to claim 1 wherein each overlapping group of data samples is from two to twenty samples in all of said n-dimensions.

5. Apparatus according to claim 1 wherein said data samples in said array are selected from the group consisting of optical samples, infrared samples, radar samples, x-ray samples, and sound samples.

6. Apparatus according to claim 1 wherein said comparing means compares indexes of quantized groups of data samples in a predetermined order until a match to one of said reference indexes occurs, and thereafter said comparing means compares indexes of quantized groups of data samples from a window around the index which caused said match.

7. Apparatus according to claim 6 wherein said metric means generates said target detect signal based only on indexes within said window which match said reference indexes.

8. Apparatus according to claim 7 which further includes an index storage means, coupled between said quantizing means and said comparing means, for receiving and storing a plurality of indexes from said quantizing means; and an index retrieving means for reading indexes from said index storage means and sending them to said comparing means.

9. Apparatus according to claim 7 wherein said reading means, quantizing means, and comparing means are serially intercoupled and operate sequentially one after the other for each group of data samples that is read from said array.

10. Apparatus according to claim 1 wherein said comparing means compares indexes of quantized groups of data samples in a predetermined order until a match to one of said reference indexes occurs; and thereafter said reading means reads data samples from a window around the data sample group whose index caused said match.

11. Apparatus according to claim 10 which further includes a correlation means for spatially correlating data samples within said window to templates of said target and for confirming the detection of said target if said correlation meets a threshold criteria.

12. Apparatus according to claim 11 which further includes an index storage means, coupled between said quantizing means and said comparing means, for receiving and storing a plurality of indexes from said quantizing means; and an index retrieving means for reading indexes from said index storage means and sending them to said comparing means.

13. Apparatus according to claim 11 wherein said reading means, quantizing means, and comparing means are serially intercoupled and operate sequentially one after the other for each group of data samples that is read from said array.

* * * * *